United States Patent
Hwang et al.

(10) Patent No.: US 8,759,436 B2
(45) Date of Patent: Jun. 24, 2014

(54) TRANSPARENT COLOR COATING COMPOSITION CONTAINING NANOSIZE DISPERSED PIGMENTS, COATED SUBSTRATE AND METHOD FOR PREPARING SAME

(75) Inventors: Hoon Hwang, Gyeongsangnam-do (KR); Kyong Gue Lee, Chungcheongbuk-do (KR); Chun Hwa Shin, Chungcheongbuk-do (KR); Seol Gyeong Choe, Chungcheongbuk-do (KR)

(73) Assignee: Nepes Co., Ltd., Chungcheongbuk-Do (KR)

( * ) Notice: Subject to any disclaimer, the term of this patent is extended or adjusted under 35 U.S.C. 154(b) by 413 days.

(21) Appl. No.: 13/143,626

(22) PCT Filed: Dec. 31, 2009

(86) PCT No.: PCT/KR2009/008010
§ 371 (c)(1),
(2), (4) Date: Jul. 7, 2011

(87) PCT Pub. No.: WO2010/079923
PCT Pub. Date: Jul. 15, 2010

(65) Prior Publication Data
US 2011/0281971 A1 Nov. 17, 2011

(30) Foreign Application Priority Data
Jan. 9, 2009 (KR) .................. 10-2009-0001867

(51) Int. Cl.
*C08J 3/20* (2006.01)
*C09B 67/00* (2006.01)
*C08L 33/08* (2006.01)
*C08K 3/00* (2006.01)
*C08K 13/02* (2006.01)

(52) U.S. Cl.
CPC ............... *C08L 33/08* (2013.01); *C08K 3/0033* (2013.01); *C08K 13/02* (2013.01)
USPC ........... 524/502; 524/376; 524/378; 524/379; 523/351

(58) Field of Classification Search
CPC ....... C08L 33/08; C08K 9/0033; C08K 13/02
USPC .......... 523/351; 524/315, 320, 317, 376–579; 977/779
See application file for complete search history.

(56) References Cited

U.S. PATENT DOCUMENTS

| | | | | |
|---|---|---|---|---|
| 5,698,618 A | * | 12/1997 | Kamikubo et al. | 524/88 |
| 7,008,994 B1 | * | 3/2006 | Waki | 524/556 |
| 2007/0184260 A1 | | 8/2007 | Saito et al. | |

FOREIGN PATENT DOCUMENTS

| | | |
|---|---|---|
| JP | 2000-026803 | 1/2000 |
| JP | 2008-163258 | 7/2008 |
| KR | 10-2004-0072338 | 8/2004 |
| KR | 10-2005-0120888 | 12/2005 |
| KR | 10-2006-0030784 | 4/2006 |
| KR | 10-0667996 | 1/2007 |

* cited by examiner

*Primary Examiner* — Hannah Pak
(74) *Attorney, Agent, or Firm* — Occhiuti & Rohlicek LLP

(57) ABSTRACT

The present invention relates to a transparent color coating composition containing nano-sized dispersed pigments, to a coated substrate, and to a method for preparing the same. When used in coating glass, the transparent color coating composition expresses a variety of colors, maintains continuous color transparency, gives sun protection to glass, and has superior adhesion, solvent resistance, and sun protection properties.

15 Claims, No Drawings

US 8,759,436 B2

TRANSPARENT COLOR COATING COMPOSITION CONTAINING NANOSIZE DISPERSED PIGMENTS, COATED SUBSTRATE AND METHOD FOR PREPARING SAME

CROSS-REFERENCE TO RELATED APPLICATIONS

This application is the National Stage of International Application No. PCT/KR2009/008010, filed on Dec. 31, 2009, which claims the priority to Korean Application No. 10-2009-0001867, filed on Jan. 9, 2009, the contents of which are incorporated herein by reference in their entirety.

TECHNICAL FIELD

The present invention relates to a transparent color coating composition, which is prepared by mixing nano-sized organic pigments, a dispersant and a solvent to prepare a pigment-dispersed solution with the nano-sized organic pigments stably dispersed therein, and mixing the solution with an organic-inorganic sol-gel composite resin solution as a binder, and which can form a transparent colored glass when the composition is coated on a glass. The present invention also relates to a method of preparing the same.

BACKGROUND ART

Recently, transparent colored glass, produced by imparting color to glass, has been widely used for interior and exterior building materials. For example, colored glass coated with paint, laminated glass comprised of two sheets of glass with a resin or film interposed therebetween, colored glass manufactured by adding metal additives to glass, or the like are used. However, the colored glass coated with the paint has a blocking property by which light does not entirely pass through the glass due to the size of pigments attached to the glass. The laminated glass not only exhibits color but also maintains transparency since a transparent color resin or film is disposed between two sheets of glass. However, due to use of a dye vulnerable to ultraviolet light in order to exhibit color, the laminated glass rapidly fades over time as compared with glass using a pigment. Thus, a metal additive-based colored glass is widely used for interior and exterior building materials since it can exhibit any color while having transparency, and is resistant to ultraviolet rays.

However, since the metal additive-based colored glass currently used for interior and exterior building materials contains heavy metals, it causes environmental contamination. Further, due to restricted production in view of economic feasibility, the metal additive-based colored glass is produced/sold with limited colors such as green, blue and bronze, and thus does not properly meet consumer demand for color variety.

To solve such problems, studies have been conducted to develop coating compositions that exhibit a variety of colors and maintain transparency in coating glass.

Korean Patent Publication No. 10-2004-0072338 discloses an organic-inorganic composite resin used as a binder to have excellent adhesion, heat resistance and solvent resistance and a proper transparent pigment used to impart various colors.

In coating glass, when the organic-inorganic composite resin is used to have excellent adhesion, heat resistance and solvent resistance and the pigment for impart color to the resin is properly dispersed, the glass exhibits the color while maintaining transparency. However, since most pigments have a considerably small particle size, e.g., 0.01 µm or less, the pigments are likely to be agglomerated and have reduced dispersion stability due to decrease in compatibility with the organic-inorganic composite resin, causing an increase in the size of pigment particles and deteriorating transparency.

DISCLOSURE

Technical Problem

An aspect of the present invention provide a transparent color coating composition that is obtained by preparing a pigment-dispersed solution which has nano-sized organic pigments stably dispersed therein to exhibit a variety of colors while maintaining transparency when used in coating glass, thereby preventing a decrease in transparency which can occur due to the particle size of a conventional transparent color coating composition. Further, when mixed with an organic-inorganic composite resin solution, the pigment-dispersed solution is uniformly and stably dispersed in the organic-inorganic composite resin solution without agglomeration of the organic pigments, so that the composition exhibits excellent adhesion, heat resistance and solvent resistance when used in coating glass. Another aspect of the present invention provides a method of preparing the same.

Technical Solution

The inventors of the present invention made an attempt to solve the above problems and found that nano-sized organic pigments were stably dispersed in an organic-inorganic sol-gel composite resin solution without agglomeration by mixing the nano-sized organic pigments, a particular dispersant and a solvent to prepare a pigment-dispersed solution in which the nano-sized organic pigments are stably dispersed in the solution, followed by mixing the pigment-dispersed solution with the organic-inorganic sol-gel composite resin solution as a binder.

That is, it is important to select a dispersant capable of stably dispersing nano-sized organic pigments. An organic-inorganic sol-gel composite resin binder reacts with a functional group of a base in the dispersant surrounding the organic pigments and decreases the dispersion stability of the organic pigments. Thus, the inventors of the present invention found that the nano-sized organic pigments are stably dispersed in the organic-inorganic sol-gel composite resin solution when a dispersant having an amine value of 0 or a relatively low amine value is used.

Further, when such transparent color coating compositions are mixed together to obtain a desired color, organic pigments of different colors can be uniformly dispersed without agglomerating, thereby producing transparent colored glass. In addition, when the transparent color coating composition further comprises metal oxides, the metal oxides can be stably dispersed to exhibit UV blocking effects.

Advantageous Effects

As described above, a dispersant which does not react with an organic-inorganic sol-gel composite resin binder is selected to prepare a pigment solution including an organic pigment, the dispersant, and an organic solvent, and the pigment-dispersed solution is mixed with the organic-inorganic sol-gel composite resin binder, thereby preparing a transparent color coating composition. When such transparent color coating compositions are used alone or as a mixture for a desired color in coating glass, the glass has various colors while maintaining transparency due to stable dispersion of the nano-sized organic pigments. Further, these transparent color coating compositions are applied to glass, acryl, polycarbonate, or the like, thereby being utilized for various uses, such as interior and exterior building materials, interior decorative materials, automotive glass, or the like.

BEST MODEL

Hereinafter, the present invention will be described in detail.

A transparent color coating composition according to an embodiment of the present invention includes an organic-inorganic sol-gel composite resin binder solution, a pigment-dispersed solution, and a UV blocking agent, which are described as follows.

As the binder solution used for the transparent color coating composition, an organic-inorganic sol-gel composite resin solution having good pencil hardness, adhesion, and solvent resistance can be used. The organic-inorganic sol-gel composite resin solution is an organic-inorganic composite resin formed of an inorganic resin synthesized through reaction of a metal colloidal sol and silane and an organic resin of an acrylic copolymer.

The viscosity of the organic-inorganic sol-gel composite resin binder solution can be adjusted by properly diluting, using a solvent, the organic-inorganic sol-gel composite resin which is composed of an acrylic copolymer resin and an inorganic ceramic and has a solid content of 50 to 80% by weight (wt %), in consideration of adhesion of a coating film. The organic-inorganic sol-gel composite resin binder solution is present in an amount of 80 to 99.9 wt % based on 100 wt % of the transparent color coating composition. When the amount of the binder is less than 80 wt %, a coated film using the transparent color coating composition may have decreased pencil hardness, adhesion, and solvent resistance.

The organic solvent used for diluting the organic-inorganic sol-gel composite resin binder may include at least one selected from the group consisting of diethylene glycol monoethyl ether acetate, propylene glycol monomethyl ether, propylene glycol monomethyl ether acetate, propylene glycol monoethyl ether, propylene glycol monoethyl ether acetate, methyl cellosolve, ethyl cellosolve, epoxypropionic acid, xylene, toluene, ethyl acetate, methyl acetate, butyl acetate, methyl ethyl ketone, cyclohexanone, butanol, ethanol, methanol, isopropanol, and combinations thereof.

In particular, the organic-inorganic sol-gel composite resin is composed of an acrylic copolymer resin and an inorganic ceramic that is a sol-gel silicate, wherein the acrylic polymer resin is hydrophobic (nonpolar) and the sol-gel silicate is hydrophilic (polar). Thus, a mixture of a nonpolar solvent and a polar solvent may be preferably used as a diluent. solvents and a mixture ratio thereof may be properly selected and determined in view of a finger set-to-touch time, a defect such as flow, adhesion of a film, mud crack, or the like.

As the organic pigment used for the pigment-dispersed solution, azo, phthalocyanine, quinacridone, dioxazine, perylene, quinophtalone, isoindolinone, isoindonine, and di-pyrrolo-pyrrole organic pigments having a primary particle size of 10 to 200 nm may be used. These organic pigments may be used alone or as mixtures in order to obtain a desired color. The organic pigment may be present in an amount of 1 to 30 wt % based on 100 wt % of the pigment-dispersed solution. When the amount is greater than 30 wt %, the dispersion stability of the organic pigment may be decreased.

As a dispersant used for the pigment-dispersed solution, polyester dispersants, polyacrylate dispersants, polyurethane dispersants, and polyether dispersants may be used. Among these dispersants, non-ionic polymer dispersants having an amine value of 10 mgKOH/g or less may be used alone or as mixtures.

A conventional dispersant is added in a process of dispersing a pigment and a solvent, thereby obtaining a pigment-dispersed composition. However, in the pigment-dispersed composition, pigment particles are easily agglomerated. Further, since the organic pigment is formed of individual molecules, most of which are generally nonpolar on the surface. As a result, these pigment particles are not sufficiently deagglomerated to stabilize.

Thus, the dispersant needs increased dispersion force by adsorption to the surface of the pigment due to a polar pigment-philic group, e.g., a hydroxyl group, a carboxyl group, an amine group, and the like to generate electrostatic repulsive force. Further, the dispersant also needs to have a molecular structure of nonpolar chain having excellent compatibility so that steric hindrance occurs, thereby providing dispersibility and preventing re-agglomeration of pigments.

In particular, the dispersant used in the present invention includes polyacrylate non-ionic polymer dispersants having at least one pigment-philic group selected from the group consisting of a hydroxyl group, a carboxyl group, and an amine group.

The polyacrylate dispersants have a linear C-C backbone structure, which forms an anchoring group (pigment-philic group) reacting with various pigments, and other groups which function as acrylate resins to provide steric hindrance effects so that adjacent pigments are not re-agglomerated.

However, the organic-inorganic sol-gel composite resin binder reacts with a functional group of a base in the dispersant surrounding the organic pigment, thereby decreasing the dispersion stability of the organic pigment. Thus a dispersant having an amine value of 0 or a low amine value is used.

In this case, the polyacrylate dispersant may have an amine value of 0 to 10 mgKOH/g. When the amine value exceeds 10 mgKOH/g, dispersed particles are agglomerated, reducing dispersion stability.

Further, the dispersant may have a weight average molecular weight of 4,000 to 35,000 g/mol. When the weight average molecular weight is less than 4,000 g/mol, dispersibility decreases. When the weight average molecular weight exceeds 35,000 g/mol, steric hindrance may be reduced and stability may be decreased due to particle agglomeration.

The dispersant may be present in an amount of 1 to 30 wt % based on 100 wt % of the pigment-dispersed solution.

An organic solvent used for the pigment-dispersed solution may include diethylene glycol monoethyl ether acetate, propylene glycol monomethyl ether, propylene glycol monomethyl ether acetate, propylene glycol monoethyl ether, propylene glycol monoethyl ether acetate, methyl cellosolve, ethyl cellosolve, epoxypropionic acid, xylene, toluene, ethyl acetate, methyl acetate, butyl acetate, methyl ethyl ketone, cyclohexanone, butanol, ethanol, methanol, and isopropanol, which are used alone or as mixtures. The organic solvent may be present in an amount of 40 to 90 wt % based on 100 wt % of the pigment-dispersed solution.

Most organic pigments are nonpolar, and thus are not dissolved in a polar solvent, e.g., water. However, pigments actually include a small amount of impurities, which may often be dissolved in a polar solvent, such as water, and thus the polarity of the solvent may need to be adjusted so that such impurities are not dissolved.

Further, the polarity of the solvent is adjusted to improve dispersion of pigments without agglomeration of the pigments and to enhance the solubility of the resin as well as the solubility of the dispersant, thereby obtaining a coating material including both resin and pigment having excellent dispersibility.

Thus, the organic solvent used for the pigment-dispersed solution of the present invention is not specifically limited as long as it has a polarity (sp value) of 0.5 or less.

The sp value of a solvent denotes a solubility parameter δ and a barometer to represent the polarity of the solvent. The sp value of a solvent may be expressed by cohesive energy density and the volume of molecules as follows.

Solubility parameter $(\delta)=(\Delta Ev/V)_{1/2}$, where ΔEv represents cohesive energy density and V represents the volume of molecules.

The pigment-dispersed solution containing the organic pigment, the dispersant, and the solvent includes 1 to 30 wt % of the organic pigment, 1 to 30 wt % of the dispersant, and 40 to 90 wt % of the solvent, which are uniformly dispersed. The pigment-dispersed solution may be present in an amount of 0.1 to 20 wt % based on 100 wt % of the transparent color coating composition, and may have a final particle size of 10 to 400 nm and a viscosity of 30 cPs or less at room temperature.

The organic-inorganic sol-gel composite resin may further include at least one additive of a UV blocking agent, a leveling agent, a thermal insulating agent, a water repellent, a hydrophilic agent, and a heat generating agent. The additive may be present in an amount of 0.01 to 2 wt % based on the total weight of the transparent color coating composition.

A method of preparing a transparent color coating composition according to an embodiment of the invention includes: stirring 1 to 30 wt % of a dispersant and 40 to 90 wt % of a solvent based on 100 wt % of a pigment-dispersed solution composition in a dispersing device to prepare a uniform dispersant solution; adding 1 to 30 wt % of an organic pigment having a desired color based on 100 wt % of the pigment-dispersed solution composition such that the pigment is wetted in the dispersant solution and then uniformly dispersed, thereby preparing a pigment-dispersed solution; mixing and homogenizing 50 to 80 wt % of an organic-inorganic sol-gel composite resin, which is composed of an acrylic copolymer resin and inorganic ceramic, and 20 to 50 wt % of a solvent, thereby preparing an organic-inorganic sol-gel composite resin binder solution; and mixing 0.1 to 20 wt % of the pigment-dispersed solution and 80 to 99.9 wt % of the organic-inorganic sol-gel composite resin binder solution based on 100 wt % of the transparent color coating composition, thereby preparing a transparent color coating composition.

In the mixing the pigment-dispersed solution and the organic-inorganic sol-gel composite resin binder solution, at least one additive of a UV blocking agent, a leveling agent, a thermal insulating agent, a water repellent, a hydrophilic agent, and a heat generating agent may be added in an amount of 0.01 to 2 wt % based on the total weight of the transparent color coating composition.

The transparent color coating composition may have a similar final particle size to a final particle size of the pigment-dispersed solution of 10 to 400 nm.

The prepared transparent color coating composition may be applied to a transparent substrate, such as glass, acryl, a film, or the like, by one method of spray coating, slit coating, roll coating, and screen coating. The coated composition may be cured by natural curing, heat curing, UV curing, or the like based on curing conditions of the binder contained in the composition, thereby forming a coated film. The thickness of the coated film may be adjusted depending on the solid content of the binder, color shade, and desired properties. Preferably the thickness of the coated film is 1 to 30 μm. When the thickness is 30 μm or more, the adhesion of the film can be reduced and the film can crack.

Hereinafter, the present invention will be described in more detail with reference to the following examples. However, it should be understood that the present invention is not limited to the illustrated examples and may be embodied in various different ways.

MODE FOR INVENTION

An organic solvent and a dispersant were put in a vertical bead mill according to compositions listed in Table 1 and stirred for 30 minutes. A phthalocyanine blue organic pigment was added thereto and stirred for 1 hour to be wetted in the dispersant solution, after which yttrium zirconium beads were added in the same volume ratio as the mixture solution and dispersed at 2,500 to 3,000 rpm for 2 hours, thereby preparing a pigment-dispersed solution. The particle size of the pigment-dispersed solution was measured using an ELS-8000 (Otsuka Electronics) and the viscosity was measured using an SV viscometer (A&D), and results are shown in Table 2.

TABLE 1

| Category | Component | | Example 1 | Example 2 | Comparative Example 1 |
|---|---|---|---|---|---|
| Pigment-dispersed solution | Organic pigment | (1) | 36 | 36 | 36 |
| | Dispersant | (2) | 12 | 12 | — |
| | | (3) | — | — | 12 |
| | Organic solvent | (4) | 252 | 252 | 252 |
| Binder solution | Sol-gel organic/inorganic composition resin | (5) | 3420 | 3420 | 3420 |
| | Organic solvent | (4) | 1140 | 1140 | 1140 |
| | | (6) | 1140 | 1140 | 1140 |
| UV blocking agent | Metal oxide | (7) | — | 180 | — |

(1) EP-193: Phthaloxyanine Fastogen blue EP-193 having a primary particle size of 40 to 50 nm (DIC)
(2) Dispersant 1: Polyacrylate having an amine value of 0 (BYK Chemie)
(3) Dispersant 2: Polyacrylate having an amine value of 45 (BYK Chemie)
(4) PGMEA: Propylene glycol monomethyl ether acetate
(5) MIO Y067G: Binder for glass having a solid content of 50 wt % (DNC)
(6) EC: Ethyl cellosolve
(7) Zinc Oxide: Primary particle size of 20 nm The thus prepared pigment-dispersed solution was mixed with an organic-inorganic sol-gel composite resin solution as a binder and zinc oxide having a size of 20 nm as a UV blocking agent at room temperature according to the compositions listed in Table 1, thereby preparing a transparent color coating composition. The particle size of the transparent color coating composition was measured using an ELS-8000 (Otsuka Electronics), and results are shown in Table 2.

TABLE 2

| | Category | Example 1 | Example 2 | Comparative Example 1 |
|---|---|---|---|---|
| Pigment-dispersed solution | Particle size (nm) | 67 | 71 | 74 |
| | Viscosity (cPs, 25° C.) | 3.42 | 3.45 | 3.89 |
| transparent color coating composition | Particle size (nm) | 75 | 79 | Not measurable* |

*In mixing the pigment-dispersed solution with the binder solution, pigments were agglomerated and became large enough to be identified with naked eyes, and thus it was difficult to measure the particle size using the ELS-8000.

As a result of measuring the particle size of the transparent color coating composition prepared by mixing the binder for glass and the pigment-dispersed solution, shown in Table 2, the compositions according to Examples 1 and 2 stably maintain the particle size of the organic pigment and the particle size of the metal oxide. In Comparative Example 1 where a dispersant having an amine value of 45 is used, when the pigment-dispersed solution is mixed with the binder, the organic pigments are agglomerated and thus are not dispersed, so that it is impossible to measure the particle size and the pigment-dispersed solution is separated from the binder.

The prepared transparent color coating composition was applied to a glass specimen to a thickness of 10±5 μm by spray coating and forcibly dried at 80° C. for 3 minutes and then at 180° C. for 40 minutes, after which pencil hardness, adhesion, solvent resistance, and UV transmission were evaluated by the following methods, and results are shown in Table 3.

<Methods of Evaluation of Physical Properties>

(1) Pencil Hardness

The hardness of the coated film was measured at a load of 1 kg, an angle of 45 degrees, a rate of 50 mm/min, and a transferring distance of 100 mm.

(2) Adhesion

The coated film on the glass specimen was cut at an interval of 1 mm in the width and the length to produce 100 sections having a size of 1×1 mm. The coated film on the glass specimen was put in boiling water at 100° C. for 30 minutes and taken out, and a cellophane tape was evenly attached to the coated film and quickly detached. Then, 1×1-mm sections remaining on the cut side were counted.

(3) Solvent Resistance

A specimen was wiped with cloth soaked with ethanol from side to side 100 times, and then observed with naked eyes.

(4) UV Transmission (%)

UV transmission (%) was measured in accordance with JIS A5759:1998 in a range of 282.5 to 377.5 nm.

TABLE 3

| Category | Example 1 | Example 2 | Comparative Example 1 |
|---|---|---|---|
| Pencil hardness | 6H | 6H | 6H |
| Adhesion | 100/100 | 100/100 | 100/100 |
| Solvent resistance | ○ | ○ | ○ |
| UV transmission (%) | 31.5 | 9.6 | 33.1 |

○: good,
Δ: normal,
X: fail

As shown in Table 3, when the transparent color coating compositions according to Examples 1 and 2 are applied to glass, excellent pencil hardness, adhesion, and solvent resistance are exhibited. However, although the composition according to Comparative Example 1 has similar properties to the composition in Example 1, the dispersibility of the pigment is reduced, so that the coated surface does not have an even color. In Example 2 where the metal oxide is used, remarkable UV blocking effects are obtained.

The invention claimed is:

1. A transparent color coating composition comprising:
80 to 99.9 wt % of an organic-inorganic sol-gel composite resin binder solution, viscosity of which is adjusted by diluting, with a solvent, the organic-inorganic sol-gel composite resin binder solution comprises an organic-inorganic sol-gel composite resin composed of an acrylic copolymer resin and an inorganic ceramic, the organic-inorganic sol-gel composite resin has a solid content of 50 to 80 wt %; and
0.1 to 20 wt % of a pigment-dispersed solution, in which 1 to 30 wt % of an organic pigment, 1 to 30 wt % of a dispersant having an amine value of 0 to 10 mgKOH/g and a weight average molecular weight of 4,000 to 35,000 g/mol, and 40 to 90 wt % of a solvent are uniformly dispersed.

2. The transparent color coating composition of claim 1, further comprising: 0.01 to 2 wt % of at least one additive of a UV blocking agent, a leveling agent, a thermal insulating agent, a water repellent, a hydrophilic agent, and a heat generating agent based on the total weight of the transparent color coating composition.

3. The transparent color coating composition of claim 1, wherein said organic pigment has a primary particle size of 10 to 200 nm.

4. The transparent color coating composition of claim 1, wherein said solvent for diluting the organic-inorganic sol-gel composite resin comprises at least one of diethylene glycol monoethyl ether acetate, propylene glycol monomethyl ether, propylene glycol monomethyl ether acetate, propylene glycol monoethyl ether, propylene glycol monoethyl ether acetate, methyl cellosolve, ethyl cellosolve, epoxypropionic acid, xylene, toluene, ethyl acetate, methyl acetate, butyl acetate, methyl ethyl ketone, cyclohexanone, butanol, ethanol, methanol, and isopropanol.

5. The transparent color coating composition of claim 4, wherein said solvent for diluting the organic-inorganic sol-gel composite resin comprises a mixture of a nonpolar solvent and a polar solvent.

6. The transparent color coating composition of claim 1, wherein said solvent of the pigment-dispersed solution comprises at least one of diethylene glycol monoethyl ether acetate, propylene glycol monomethyl ether, propylene glycol monomethyl ether acetate, propylene glycol monoethyl ether, propylene glycol monoethyl ether acetate, methyl cellosolve, ethyl cellosolve, epoxypropionic acid, xylene, toluene, ethyl acetate, methyl acetate, butyl acetate, methyl ethyl ketone, cyclohexanone, butanol, ethanol, methanol, and isopropanol.

7. The transparent color coating composition of claim 6, wherein said solvent of the pigment-dispersed solution comprises a nonpolar solvent or a mixture of a nonpolar solvent and a polar solvent, and has a polarity (sp value) of 0.5 or less.

8. A method of preparing a transparent color coating composition, the method comprising:
- stirring 1 to 30 wt % of a dispersant having an amine value of 0 to 10 mgKOH/g and a weight average molecular weight of 4,000 to 35,000 g/mol and 40 to 90 wt % of a solvent based on 100 wt % of a pigment-dispersed solution in a dispersing device to prepare a dispersant solution;
- adding 1 to 30 wt % of an organic pigment having a color based on 100 wt % of the pigment-dispersed solution to the dispersant solution of the dispersant and the solvent so that the pigment is wetted in the dispersant solution and then uniformly dispersed, thereby preparing the pigment-dispersed solution;
- diluting an organic-inorganic sol-gel composite resin with a solvent to prepare an organic-inorganic sol-gel composite resin binder solution having an adjusted viscosity, the organic-inorganic sol-gel composite resin is composed of an acrylic copolymer resin and an inorganic ceramic, the organic-inorganic sol-gel composite resin has a solid content of 50 to 80 wt %; and
- mixing 0.1 to 20 wt % of the pigment-dispersed solution, 80 to 99.9 wt % of the organic-inorganic sol-gel composite resin binder solution, and optionally an additive, based on 100 wt % of the transparent color coating composition, thereby preparing a transparent color coating composition.

9. The method of claim 8, wherein 0.01 to 2 wt % of at least one additive of a UV blocking agent, a leveling agent, a thermal insulating agent, a water repellent, a hydrophilic agent, and a heat generating agent is further added based on the total weight of the transparent color coating composition.

10. The method of claim 8, wherein the organic pigment has a primary particle size of 10 to 200 nm.

11. The method of claim 10, wherein said solvent for diluting the organic-inorganic sol-gel composite resin comprises at least one of diethylene glycol monoethyl ether acetate, propylene glycol monomethyl ether, propylene glycol monomethyl ether acetate, propylene glycol monoethyl ether, propylene glycol monoethyl ether acetate, methyl cellosolve, ethyl cellosolve, epoxypropionic acid, xylene, toluene, ethyl acetate, methyl acetate, butyl acetate, methyl ethyl ketone, cyclohexanone, butanol, ethanol, methanol, and isopropanol.

12. The method of claim 11, wherein said solvent for diluting the organic-inorganic sol-gel composite resin comprises a mixture solvent of a nonpolar solvent and a polar solvent.

13. The method of claim 8, wherein said solvent of the pigment-dispersed solution comprises at least one of diethylene glycol monoethyl ether acetate, propylene glycol monomethyl ether, propylene glycol monomethyl ether acetate, propylene glycol monoethyl ether, propylene glycol monoethyl ether acetate, methyl cellosolve, ethyl cellosolve, epoxypropionic acid, xylene, toluene, ethyl acetate, methyl acetate, butyl acetate, methyl ethyl ketone, cyclohexanone, butanol, ethanol, methanol, and isopropanol.

14. The method of claim 13, wherein said solvent of the pigment-dispersed solution comprises a nonpolar solvent or a mixture solvent of a nonpolar solvent and a polar solvent, and has a polarity (sp value) of 0.5 or less.

15. A transparent color coated substrate coated with the transparent color coating composition of claim 1 by a method of spray coating, slit coating, roll coating, or screen coating.

* * * * *